(12) United States Patent
Furuno et al.

(10) Patent No.: US 7,171,295 B2
(45) Date of Patent: Jan. 30, 2007

(54) CONSTRUCTION DEVICE INFORMATION PROCESSING SYSTEM AND CONSTRUCTION DEVICE INFORMATION PROCESSING METHOD

(75) Inventors: Yoshinori Furuno, Tsuchiura (JP); Fujio Matsuda, Nagareyama (JP); Shinji Akino, Ushiku (JP); Yoshinori Ohwada, Ibaraki-ken (JP); Takanobu Ikari, Tsuchiura (JP); Hiroshi Watanabe, Ushiku (JP); Yoshinori Eguchi, Tsuchiura (JP); Hiroyuki Adachi, Ibaraki-ken (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 345 days.

(21) Appl. No.: 10/502,606

(22) PCT Filed: Nov. 26, 2003

(86) PCT No.: PCT/JP03/15070

§ 371 (c)(1),
(2), (4) Date: Jul. 26, 2004

(87) PCT Pub. No.: WO2004/051537

PCT Pub. Date: Jun. 17, 2004

(65) Prior Publication Data

US 2006/0047630 A1 Mar. 2, 2006

(30) Foreign Application Priority Data

Dec. 2, 2002 (JP) ............................. 2002-349747

(51) Int. Cl.
*G06F 19/00* (2006.01)

(52) U.S. Cl. .......................... 701/50; 701/29; 701/33; 705/29

(58) Field of Classification Search .................. 701/29, 701/33, 50; 705/1, 28, 29; 37/414
See application file for complete search history.

(56) References Cited

U.S. PATENT DOCUMENTS 6,754,570 B2 * 6/2004 Iihoshi et al. ................. 701/33

(Continued)

FOREIGN PATENT DOCUMENTS

JP 2000-259729 9/2000

(Continued)

*Primary Examiner*—Gary Chin
(74) *Attorney, Agent, or Firm*—Mattingly, Stanger, Malur & Brundidge, P.C.

(57) ABSTRACT

An intermediate server 6 or a main server 5 executes the steps of displaying a work site of a construction machine or a predetermined area regarding the work site on a subcontractor's personal computer 62, prompting an input for applying to an order for work of repair/replacement of parts belonging to a predetermined component section of the construction machine, extracting the predetermined qualification requirements, which have been stored in a database 6A beforehand, from the database based on received applying information, producing an examination sheet for determining whether a local subcontractor meets the extracted qualification requirements, transmitting the examination sheet produced in the producing step to the subcontractor's personal computer 62 via a communication network, and prompting an input in predetermined places of the examination sheet. An information processing system and an information processing method for construction machines are provided which can present satisfactory services to the customer side even when the work site is in, e.g., a remote frontier region.

14 Claims, 11 Drawing Sheets

U.S. PATENT DOCUMENTS

| | | | |
|---|---|---|---|
| 6,832,175 B2 * | 12/2004 | Adachi et al. | 702/177 |
| 6,856,879 B2 * | 2/2005 | Arakawa et al. | 701/50 |
| 6,907,384 B2 * | 6/2005 | Adachi et al. | 702/184 |
| 7,050,893 B2 * | 5/2006 | Watanabe et al. | 701/33 |
| 2002/0059320 A1 * | 5/2002 | Tamaru | 707/200 |
| 2004/0210371 A1 * | 10/2004 | Adachi et al. | 701/50 |

FOREIGN PATENT DOCUMENTS

| | | |
|---|---|---|
| JP | 2002-203130 | 7/2002 |
| JP | 2002-332662 | 11/2002 |
| KR | 2000-0059059 | 10/2000 |

* cited by examiner

FIG.8

Select a proper value or word from among options listed below.
Put an alphabet indicative of the selected value or word in a corresponding blank so as to complete a sentence.

Different voltages are applied to a heating wire, and a value of the current flowing through the heating wire is checked at each voltage level. The measured relationship between voltage and current is shown in the following graph.

(1) When a voltage of 20 V is applied to the heating wire, a current of [ ] flows through the heating wire.
(2) The relationship between voltage and current is [ ].
    That relationship is called [ ]'s Law.

A : 0.15A
B : 1.5A
C : 15A
D : proportional
E : inverse proportional
F : Ohm
G : Fleming

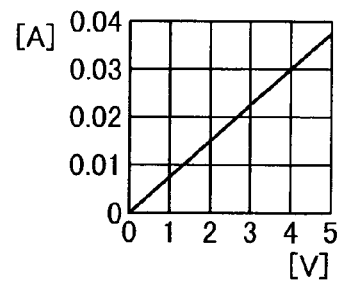

FIG.9

There are two electric circuits each comprising a heating wire of 10Ω and a heating wire of 20Ω. In those circuits, switches S1 and S2, a power supply of 13.2 V, and an ammeter are disposed as shown.

Enter an answer directly in an answer space using half-size of alphanumeric characters.

(1) Determine what current value the ammeter points when only the switch S1 is closed.

Answer:    A (2) Determine what current value the ammeter points when only the switch S2 is closed.

Answer:    A (3) When the switches S1 and S2 are closed at the same time, the ammeter reads 0.6 A. Determine the voltage between points A and B in the following circuit. Also, determine a value of the current flowing a point P in the circuit.

Answer:    V,    A

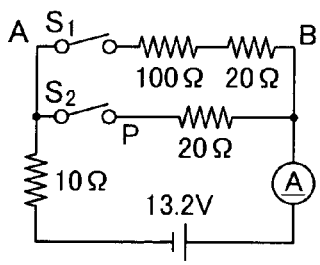

FIG.10

Heating wires R1 to R4, ammeters A1 and A2, and a power supply are connected as shown. The resistances R1 to R3 are each 8Ω. The value of the resistance R4 is unknown. An ammeter A1 reads 5 A and an ammeter A2 reads 2 A.

Enter an answer directly in an answer space using half-size of alphanumeric characters.

(1) Determine the heating wires through which a current flows at the same value.

Answer:           , (2) Determine the value of the current flowing through the resistor R3.

Answer:      A (3) Determine the voltage applied to the resistor R4.

Answer:      V (4) Determine the resistance value of the resistor R4.

Answer      Ω

(5) Determine the voltage of the power supply in a circuit shown below.

Answer:      V

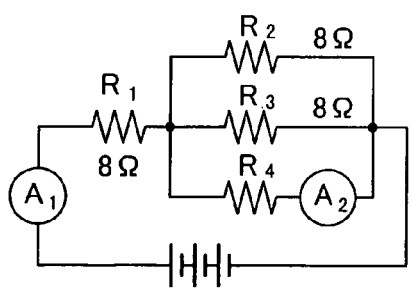

FIG.11

Select a proper value or word from among options listed below.
Put a number indicative of the selected value or word in a corresponding blank so as to complete a sentence.

Heating wires H1, H2 made of the same material and differing from each other only in cross-sectional area, an ammeter, a voltmeter, a DC power supply, and a switch are connected as shown in Illustration 1. When the switch is turned on, the voltmeter reads 6 V and the ammeter is connected to a terminal of 500 mA. A resistance ratio of H1 to H2 is 1 : 4.

(1) What is the current value pointed by the ammeter shown in Illustration 2?
  Answer: [   ] mA
(2) Determine the cross-sectional area ratio between H1 and H2.
  Answer: [   ]
(3) Determine the resistance value of H1. Also, determine the voltage of the power supply.
  Answer: [   ] Ω, [   ] V

1 : 10.5    6 : 1:16
2 : 150     7 : 10
3 : 4:1     8 : 7.5
4 : 1:4
5 : 16:1

1 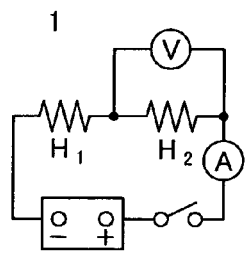

2 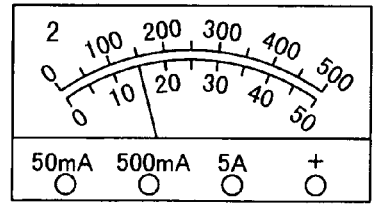

CONSTRUCTION DEVICE INFORMATION PROCESSING SYSTEM AND CONSTRUCTION DEVICE INFORMATION PROCESSING METHOD

TECHNICAL FIELD

The present invention relates to an information processing system for construction machines, and more particularly to an information processing system for construction machines and an information processing method for construction machines, which enable satisfactory services to be presented to the customer side even when a work site is in a remote frontier region or the like.

BACKGROUND ART

In hydraulic construction machines such as hydraulic excavators, maintenance has been conventionally carried out by servicemen who periodically make the rounds of their assigned areas. The servicemen measure operation data of the hydraulic construction machines and component parts thereof, and predict the life of each part based on design data and experiences. Then, the servicemen individually manage the timing of maintenance and other information to prevent the occurrence of failures.

To cope with those situations, as disclosed in, e.g., JP,A 2000-259729, an information providing system for construction machines is already known in which, by utilizing the recent information communication technology, information such as operation data of construction machines distributed all over the world is transmitted to one place so that the information of all the construction machines is collected and managed in a centralized manner based on the transmitted data.

According to that prior-art system, the operating status of each construction machine is detected as operation data by operation sensors, and the detected operation data is periodically transmitted by an operation data communicating device to a support center installed in one certain place. The support center receives the transmitted operation data and records it in a main database. Based on the recorded operation data, the support center predicts a possibility of the occurrence of failures for each construction machine and automatically outputs a report. Such a system configuration liberates the servicemen from skills otherwise required for prediction of failures and enables the prediction of failures to be always made at a certain level of accuracy.

DISCLOSURE OF THE INVENTION

Because construction machines are used outdoor under severe environments from their own characteristics, customer services, such as repair, replacement and maintenance of parts after manufacturing and selling, are very important in the field of construction machines. It is general that the customer services are performed by a number of selling companies (so-called dealers), branch offices, etc., which are set up in widely distributed way in each of, e.g., divided districts or areas. The selling companies, etc. are constantly in direct contact with customers and are well acquainted with specific situations and environments (such as natural environment, economical environment, legal situation, cultural background, and labor environment) per local area and customer. Based on those stances and knowledge, the selling companies, etc. can give sufficiently satisfied and appropriate care to the customers with careful consideration.

Depending on work to be carried out by construction machines, the work site is often located in a remote region, e.g., a village in the bosom of a mountain or a frontier area, far away from the place where the selling company, etc. exists. Such a case tends to occur especially in construction work for new highways or railroads, mining, and so on. Even in that case, the prior-art system enables the support center to manage the operating statuses of construction machines in a centralized manner and to predict a possibility of failures. However, customer services based on the collected data are actually performed by the selling companies, etc., and the distance to the work site is often very long even from the nearest selling company, etc., as mentioned above. For those reasons, it is in fact difficult to present satisfactory services to the customer side.

The present invention has been made in view of the situations set forth above, and its object is to provide an information processing system for construction machines and an information processing method for construction machines, which enable satisfactory services to be presented to the customer side even when a work site is in a remote frontier region or the like.

(1) To achieve the above object, the present invention provides an information processing system for construction machines, which presents, to customers owing construction machines, service information for each of the construction machines, wherein the information processing system comprises a database for storing predetermined qualification requirements with regard to a working capability, equipment and facilities necessary for repair/replacement of parts of the construction machine; and a service server disposed on the side providing information calling for a repair/replacement subcontractor for the construction machine and connected via a communication network to terminals on the side of recipients receiving the information calling for the repair/replacement subcontractor for the construction machine, the service server executing the steps of displaying a work site of the construction machine or a predetermined area regarding the work site at the terminals on the information recipient side, and prompting an input for applying to an order of repair/replacement work for parts belonging to a predetermined component section of the construction machine; confirming applying information entered from the terminals on the information recipient side; extracting the predetermined qualification requirements, which have been stored in the database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

In the present invention, when the work site of the construction machine owned by the customer is located in a remote region, e.g., a village in the bosom of a mountain or a frontier area, far away from the place where the selling company or the like exists, a subcontractor is publicly called for who exists in the neighborhood and is capable of presenting services (supply of parts or repair/replacement work). More specifically, a work site of the construction machine or a predetermined area regarding the work site is displayed on, e.g., a homepage of the selling company or the like, and a calling-for screen is displayed on the homepage to prompt an input for applying to an order of supply of parts of the construction machine to be serviced or repair/replacement work for the parts. When an input for applying to the order is entered from one or more subcontractors demanding to receive the order, predetermined qualification requirements are extracted which are used to determine whether parts capable of being supplied from the applying subcontractor meet the specifications, or whether the applying subcontractor has a working capability, equipment, facilities, etc. necessary for the repair/replacement of the parts. An examination sheet is produced depending on the extracted qualification requirements and is transmitted to the applying subcontractor to be displayed there, thus prompting an input in predetermined places of the sheet. This enables the selling company or the like to judge whether the applying subcontractor is suitable as presenting the services to the relevant customer. Therefore, the selling company or the like can, for example, certify one of the applying subcontractors who has been judged as optimum, and can commission the certified subcontractor to take charge in presenting the services to the relevant customer instead of the selling company or the like. As a result, even when the work site is in a remote place far away from the selling company or the like, it is possible to call for and select the subcontractor suitable for presenting the services in a near range from the work site, and to present satisfactory services to the relevant customer.

(2) Also, to achieve the above object, the present invention provides an information processing system for construction machines, which presents, to customers owing construction machines, service information for each of the construction machines, wherein the information processing system comprises a database for storing predetermined qualification requirements with regard to parts necessary for repair/replacement of the construction machine; and a service server disposed on the side providing information calling for a subcontractor for supplying parts of the construction machine and connected via a communication network to terminals on the side of recipients receiving the information calling for the parts supply subcontractor for the construction machine, the service server executing the steps of displaying a work site of the construction machine or a predetermined area regarding the work site at the terminals on the information recipient side, and prompting an input for applying to an order of supply of parts necessary for repair/replacement related to a predetermined component section of the construction machine; confirming applying information entered from the terminals on the information recipient side; extracting the predetermined qualification requirements, which have been stored in the database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

(3) Further, to achieve the above object, the present invention provides an information processing system for construction machines, which presents, to customers owing construction machines, service information for each of the construction machines, wherein the information processing system comprises a database for storing predetermined qualification requirements with regard to parts necessary for repair/replacement of the construction machine and a working capability, equipment and facilities necessary for the repair/replacement; and a service server disposed on the side providing information calling for a parts-supply and repair/replacement subcontractor for the construction machine and connected via a communication network to terminals on the side of recipients receiving the information calling for the parts-supply and repair/replacement subcontractor for the construction machine, the service server executing the steps of displaying a work site of the construction machine or a predetermined area regarding the work site at the terminals on the information recipient side, and prompting an input for applying to an order of supply of parts necessary for repair/replacement related to a predetermined component section of the construction machine and work of the repair/replacement; confirming applying information entered from the terminals on the information recipient side; extracting the predetermined qualification requirements, which have been stored in the database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

(4) In any one of above (1) to (3), the service server executes the steps of receiving information entered in the predetermined places of the examination sheet and transmitted from the terminals on the information recipient side; determining, based on the entered information received in the receiving step, who of the information recipients meets the qualification requirements; producing, if the determination is affirmatively made in the determining step, a proof indicating that the relevant information recipient has been certified as the parts-supply subcontractor, the repair/replacement subcontractor, or the parts-supply and repair/replacement subcontractor; and transmitting the proof of the certification produced in the producing step to corresponding one of the terminals on the information recipient side.

(5) In any one of above (1) to (4), the service server is disposed in a manufacturer or an information management firm commissioned from the manufacturer, who is located in a region far away from the work site of the construction machine owned by the customer and faces a difficulty in presenting services directly to the customer.

(6) In any one of above (1) to (4), the service server is disposed in a commissioned service agency who is located nearer to the work site of the construction machine owned by the customer than the manufacturer, but faces a difficulty in promptly presenting services the customer due to individual circumstances.

(7) In any one of above (1) to (4), the service server is disposed in a manufacturer or an information management firm commissioned from the manufacturer, who is located in a region far away from the work site of the construction machine owned by the customer and faces a difficulty in presenting services directly to the customer, or in a commissioned service agency who is located nearer to the work site than the manufacturer, but faces a difficulty in promptly presenting services the customer due to individual circumstances.

(8) To achieve the above object, the present invention provides an information processing method for construction machines via a communication network connecting terminals on the side of recipients receiving information calling for a repair/replacement subcontractor for a construction machine and a service server disposed on the side providing the information calling for the repair/replacement subcontractor for the construction machine, wherein the service server executes the steps of displaying a work site of the construction machine or a predetermined area regarding the work site at the terminals on the information recipient side, and prompting an input for applying to an order of repair/replacement work for parts belonging to a predetermined component section of the construction machine; confirming applying information entered from the terminals on the information recipient side; extracting predetermined qualification requirements with regard to a working capability, equipment and facilities necessary for repair/replacement of parts of the construction machine, which have been stored in a database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

(9) Further, to achieve the above object, the present invention provides an information processing method for construction machines via a communication network connecting terminals on the side of recipients receiving information calling for a repair/replacement subcontractor for a construction machine and a service server disposed on the side providing the information calling for the repair/replacement subcontractor for the construction machine, wherein the service server executes the steps of displaying a work site of the construction machine or a predetermined area regarding the work site at the terminals on the information recipient side, and prompting an input for applying to an order of supply of parts necessary for repair/replacement related to a predetermined component section of the construction machine; confirming applying information entered from the terminals on the information recipient side; extracting predetermined qualification requirements with regard to parts necessary for repair/replacement of the construction machine, which have been stored in a database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

(10) Further, to achieve the above object, the present invention provides an information processing method for construction machines via a communication network connecting terminals on the side of recipients receiving information calling for a repair/replacement subcontractor for a construction machine and a service server disposed on the side providing the information calling for the repair/replacement subcontractor for the construction machine, wherein the service server executes the steps of displaying a work site of the construction machine or a predetermined area regarding the work site at the terminals on the information recipient side, and prompting an input for applying to an order of supply of parts necessary for repair/replacement related to a predetermined component section of the construction machine and work of the repair/replacement; confirming applying information entered from the terminals on the information recipient side; extracting predetermined qualification requirements with regard to parts necessary for repair/replacement of the construction machine and a working capability, equipment and facilities necessary for the repair/replacement, which have been stored in a database beforehand, from the database based on the applying information received in the confirming step; producing, based on the qualification requirements extracted in the extracting step, an examination sheet for determining whether the information recipient meets the extracted qualification requirements; and transmitting the examination sheet produced in the producing step to the terminals on the information recipient side via the communication network, and prompting an input in predetermined places of the examination sheet.

(11) In any one of above (8) to (10), the service,server executes the steps of receiving information entered in the predetermined places of the examination sheet and transmitted from the terminals on the information recipient side; determining, based on the entered information received in the receiving step, who of the information recipients meets the qualification requirements; producing, if the determination is affirmatively made in the determining step, a proof indicating that the relevant information recipient has been certified as the parts-supply subcontractor, the repair/replacement subcontractor, or the parts-supply and repair/replacement subcontractor; and transmitting the proof of the certification produced in said producing step to corresponding one of the terminals on the information recipient side.

(12) In any one of above (8) to (11), the service server is disposed in a manufacturer or an information management firm commissioned from the manufacturer, who is located in a region far away from the work site of the construction machine owned by the customer and faces a difficulty in presenting services directly to the customer.

(13) In any one of above (8) to (11), the service server is disposed in a commissioned service agency who is located nearer to the work site of the construction machine owned by the customer than the manufacturer, but faces a difficulty in promptly presenting services the customer due to individual circumstances.

(14) In any one of above (8) to (11), the service server is disposed in a manufacturer or an in-formation management firm commissioned from the manufacturer, who is located in a region far away from the work site of the construction machine owned by the customer and faces a difficulty in presenting services directly to the customer, or in a commissioned service agency who is located nearer to the work site than the manufacturer, but faces a difficulty in promptly presenting services the customer due to individual circumstances.

BRIEF DESCRIPTION OF THE DRAWINGS

FIG. 8 shows one example of an examination sheet displayed on the subcontractor's personal computer constituting one embodiment of the information processing system for construction machines according to the present invention.

FIG. 9 shows one example of the examination sheet displayed on the subcontractor's personal computer constituting one embodiment of the information processing system for construction machines according to the present invention.

FIG. 10 shows one example of the examination sheet displayed on the subcontractor's personal computer constituting one embodiment of the information processing system for construction machines according to the present invention.

FIG. 11 shows one example of the examination sheet displayed on the subcontractor's personal computer constituting one embodiment of the information processing system for construction machines according to the present invention.

BEST MODE FOR CARRYING OUT THE INVENTION

Figure 1:
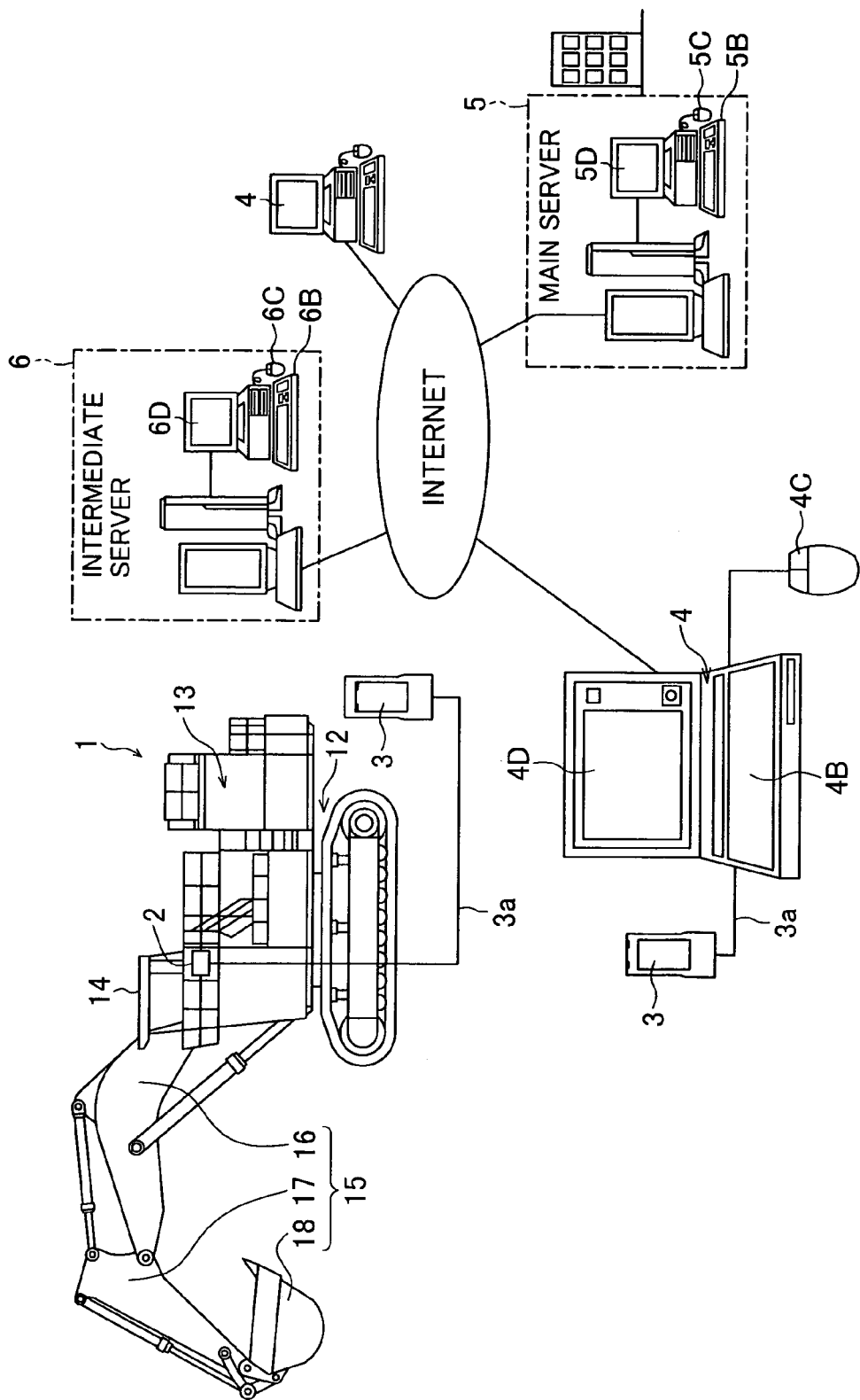
FIG. 1 is a general schematic view of a construction machine management system as a basis for one embodiment of an information processing system for construction machines according to the present invention.

One embodiment of an information processing system for construction machines according to the present invention will be described below with reference to the drawings.

This embodiment is premised, by way of example, on that a hierarchical construction machine management system is constructed (see, e.g., FIG. 3 described later) in which operation data, etc. of many construction machines are collected and stored via portable terminals, user-side personal computers near work sites and a main server, and are then managed in a centralized manner, while various items of information obtained through various analyses made in the main server are outputted to the user-side personal computers, as required, via intermediate servers in dealers or the likes (described later) (or directly from the main server in some cases). In this respect, actual services for each machine are performed such that a serviceman who belongs to corresponding one of the dealers or the likes set up in widely distributed way in each of local districts or areas goes to each user and makes the services, such as various kinds of maintenance and technical explanations, based on the data outputted to the user-side personal computer as described above and data newly obtained in the user's work site.

On the basis of the foregoing premise, a principal feature of this embodiment resides in that, when the work site of the relevant construction machine is located in a remote region, e.g., a village in the bosom of a mountain or a frontier area, far away from the place where the dealer or the like exists and a large distance from the existing dealer or the like imposes a difficulty in presenting satisfactory services, such as maintenance, under those situations, a factory or the like existing at a relatively short distance from the site and having a sufficient technical capability or a capability of supplying parts with satisfactory quality is certified as a new member of the construction machine management system to present the services for the relevant machine instead of the dealer or the like.

More specifically, in this embodiment, customer services, such as maintenance, are commissioned to a subcontractor selected from among neighboring ones who have applied for a public offer, when a manufacturer (or an information management firm commissioned from the manufacturer) exists in an area far away from the work site of the construction machine owned by the relevant customer and faces a difficulty in presenting the services directly to the relevant customer. Of course, if a later-described dealer or the like (i.e., a commissioned service firm such as a selling company, a branch office or an agency) commissioned from the manufacturer exists in a place nearer to the relevant customer than the manufacturer and can promptly present the services to the relevant customer, it is possible for the dealer or the like to present the services to the relevant customer. However, even such a dealer or the like sometimes has a difficulty in promptly presenting the services due to other various circumstances. In that case, a new subcontractor is sought, as described later, through the steps of publicly calling for subcontractors capable of promptly presenting the services, certifying one of the applicants, as a new commissioned service subcontractor for presenting the services instead of the manufacturer or the dealer or the like (described later), after confirming that the new subcontractor has a technical level satisfying certain standards, and incorporating a terminal of the new subcontractor (i.e., a subcontractor's personal computer 62 described later) in the information processing system of this embodiment.

On that occasion, factors imposing a difficulty for the manufacturer or the dealer or the like, who is commissioned for the services at present, to promptly present the services to the customer include various circumstances represented by, e.g., the distance from the customer, the time required for presenting the services, including the time required for movement to the site, shortage of staff (personnel), the absence of skills required for the services, and costs required for presenting the services, along with labor costs.

Further, though explained later in detail, the following embodiment is described, by way of example, in connection with the case in which an intermediate server 6 (described later) serves as a service server on the side providing information calling for a construction-machine parts supply and repair/replacement subcontractor, and this service server is installed in the dealer or the like (described later) who exists nearer to the work site of the construction machine owned by the customer than the manufacturer, but has a difficulty in promptly presenting the services from the above-mentioned various circumstances. However, the present invention is not limited to such an example. For instance, when the manufacturer is located relatively near the work site of the construction machine owned by the customer, but has a difficulty in promptly presenting the services, the service server may be installed in, instead of the dealer or the like, the manufacturer or the information management firm commissioned from the manufacturer. In such a case, the later-described intermediate server 6 may be disposed in the manufacturer or the information management firm, or the function of the service server may be incorporated in a main server 5 (described later) that is installed in the manufacturer or the information management firm. It is a matter of course that, in anticipation of various cases, the service server may be installed in each of the manufacturer, the information management firm, the dealer or the like in each area.

(1) Construction Machine Management System

The construction machine management system as a basis for this embodiment will first be described below.

FIG. 1 is a general schematic view of the construction machine management system. This management system comprises a machine-side controller 2 disposed in each of a plurality of hydraulic excavators 1 (representative one is only shown in FIG. 1) currently working in the fields, a portable terminal 3 connectable to the controller 2 via, e.g., a cable 3a (including a wireless way), an information terminal (personal computer; hereinafter referred to as a "user-side personal computer") 4 which is installed in, e.g., an office near the site where the hydraulic excavator 1 is operating and which is connectable to the portable terminal 3 via a cable 3a (including a wireless way), a main server 5 installed in, e.g., a manufacturer of the hydraulic excavator 1 (or an information management firm, etc. commissioned from the manufacturer), and an intermediate server 6 which is located in, e.g., each of medium- or small-sized areas (per country, district, provincial block (urban or rural prefecture), etc.) and which is installed in a selling company (dealer), a branch office, an agency, etc. (hereinafter referred to as a "dealer or the like") engaged in presenting services, such as maintenance, directly to each user (customer). The user-side personal computer 4, the main server 5, and the intermediate server 6 are connected to each other via information communication using a communication line (such as the Internet via public communication lines).

The hydraulic excavator 1 comprises a travel body 12, a swing body 13 swingably mounted on the travel body 12, a cab 14 provided in a front left portion of the swing body 13, and a front operating mechanism (excavating device) 15 provided in a front central portion of the swing body 13 in a vertically angularly movable manner. The front operating mechanism 15 is made up of a boom 16 rotatably mounted to the swing body 13, an arm 17 rotatably mounted to a fore end of the boom 16, and a bucket 18 rotatably mounted to a fore end of the arm 17.

While the hydraulic excavator 1 is shown in FIG. 1, by way of example, as the so-called super-large-sized excavator or large-sized excavator of a class having the body weight of several hundreds tons, which is employed in, e.g., oversea mines in many cases, applications of the present invention are not limited to that class of excavators. In other words, the present invention is also applicable to the so-called medium-sized excavator of a class having the body weight of several tens tons (such as shown in FIGS. 2 and 3 described later), which is most popularly employed in various construction work sites, etc. in Japan, and to the so-called mini-excavator in an even smaller class which is employed in small-scaled work sites.

Figure 2:
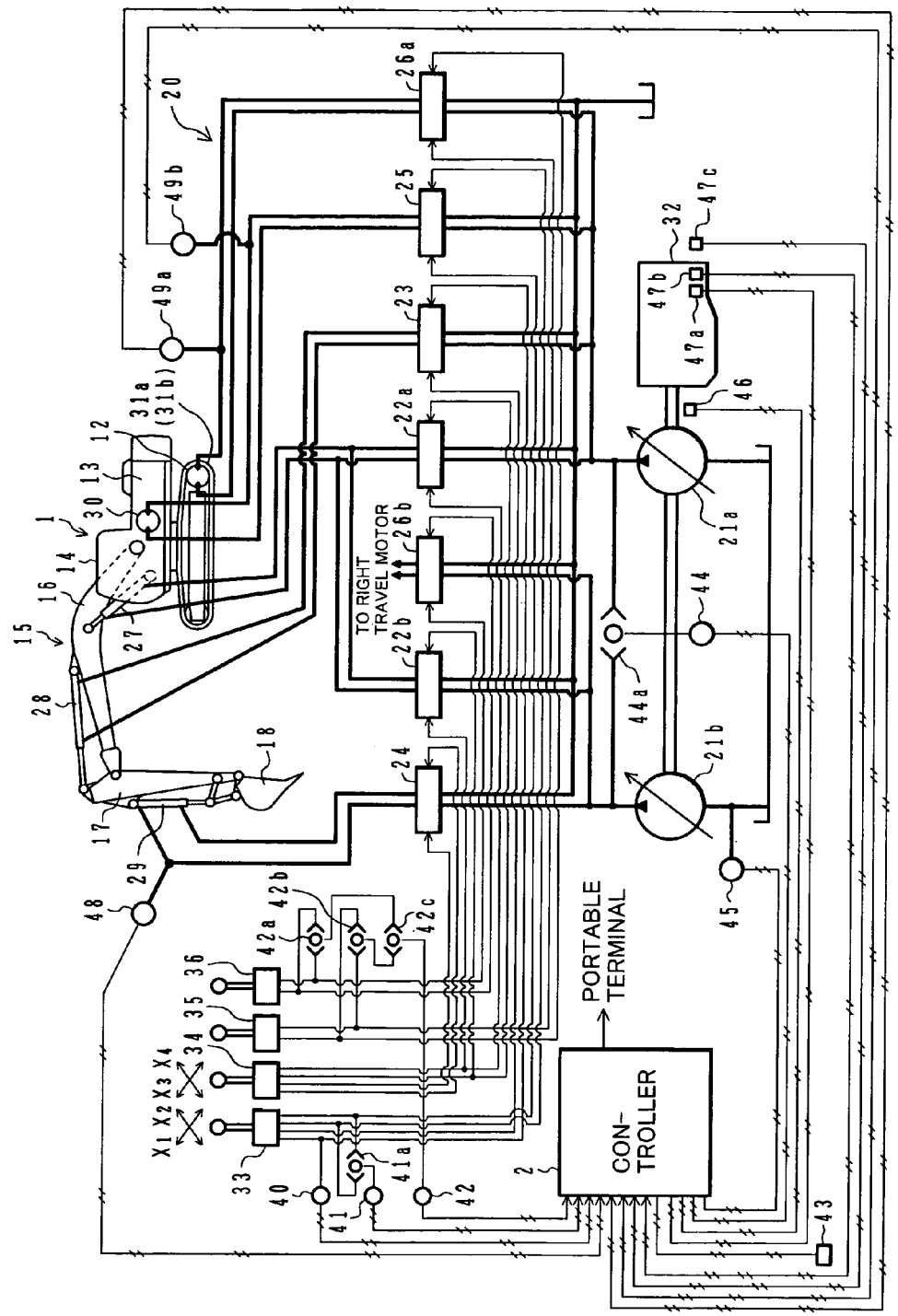
FIG. 2 is a diagram schematically showing the construction of one example of a hydraulic system equipped in a hydraulic excavator, along with sensors, to which one embodiment of the information processing system for construction machines according to the present invention is applied.
Figure 3:
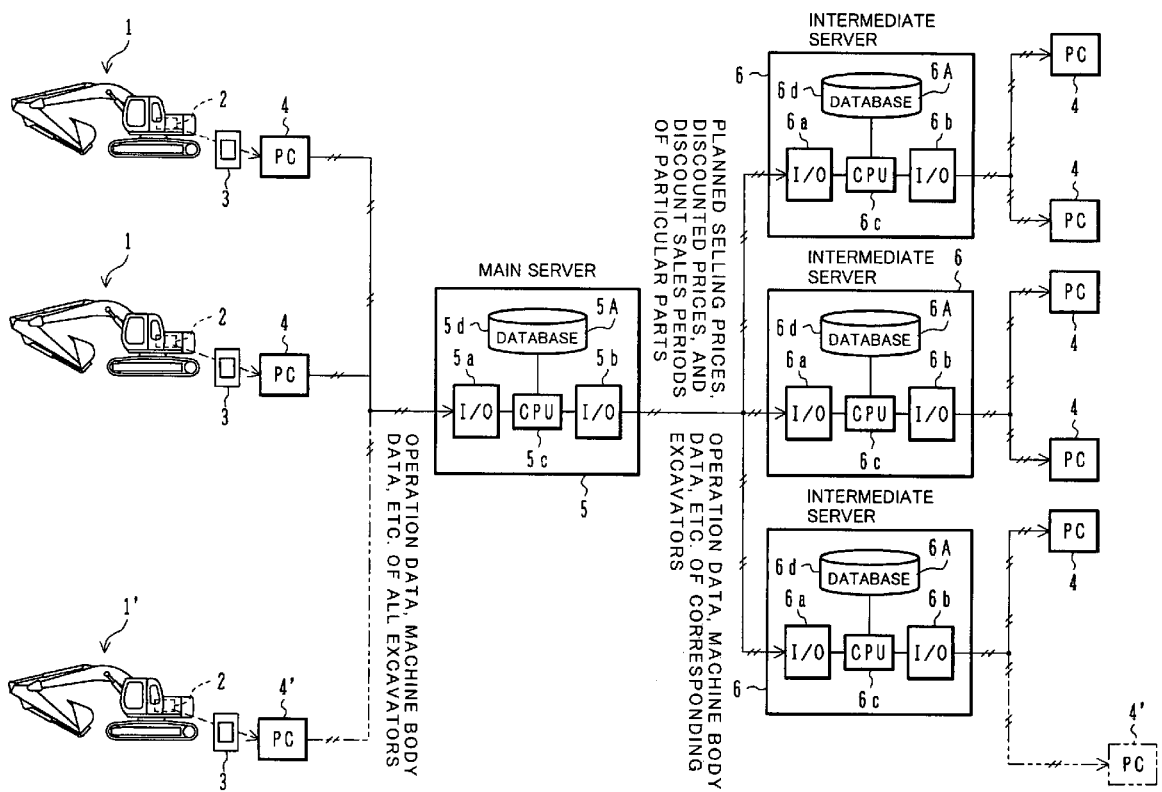
FIG. 3 is a conceptual block diagram showing a flow of information in the construction machine management system as a basis for one embodiment of the information processing system for construction machines according to the present invention.

FIG. 2 is a diagram schematically showing the construction of one example of a hydraulic system equipped in the hydraulic excavator 1 shown in FIG. 1, along with sensors, to which one embodiment of the information processing system for construction machines according to the present invention is applied.

In FIG. 2, a hydraulic system 20 equipped in the hydraulic excavator 1 comprises, for example, hydraulic pumps 21a, 21b, boom control valves 22a, 22b, an arm control valve 23, a bucket control valve 24, a swing control valve 25, travel control valves 26a, 26b, a boom cylinder 27, an arm cylinder 28, a bucket cylinder 29, a swing motor 30, and travel motors 31a, 31b.

The hydraulic pumps 21a, 21b are driven for rotation by a diesel engine (hereinafter referred to simply as an "engine") 32 provided with a fuel injecting device (not shown) of the so-called electronic governor type, and deliver a hydraulic fluid. The control valves (regulation valves) 22a, 22b–26a, 26b control respective flows (flow rates and flowing directions) of the hydraulic fluid supplied from the hydraulic pumps 21a, 21b to the hydraulic actuators 27–31a, 31b, and the hydraulic actuators 27–31a, 31b drive the boom 16, the arm 17, the bucket 18, the swing body 13, and the travel body 12. The hydraulic pumps 21a, 21b, the control valves 22a, 22b–26a, 26b, and the engine 32 are mounted in an accommodation room (engine room) behind the swing body 13.

Control lever devices 33, 34, 35 and 36 are disposed corresponding to the control valves 22a, 22b–26a, 26b. When a control lever of the control lever device 33 is manipulated in one X1 of two crossed directions, an arm-crowding pilot pressure or an arm-dumping pilot pressure is produced and applied to the arm control valve 23. When the control lever of the control lever device 33 is manipulated in the other X2 of the two crossed directions, a rightward-swing pilot pressure or a leftward-swing pilot pressure is produced and applied to the swing control valve 25.

When a control lever of the control lever device 34 is manipulated in one X3 of two crossed directions, a boom-raising pilot pressure or a boom-lowering pilot pressure is produced and applied to the boom control valves 22a, 22b. When the control lever of the control lever device 34 is manipulated in the other X4 of the two crossed directions, a bucket-crowding pilot pressure or a bucket-dumping pilot pressure is produced and applied to the bucket control valve 24. Further, when control levers of the control lever devices 35, 36 are manipulated, a left-travel pilot pressure and a right-travel pilot pressure are produced and applied to the travel control valves 26a, 26b. The control lever devices 33 to 36 are disposed in the cab 14 along with the controller 2.

Sensors 40 to 49 are disposed in the hydraulic system 20 having the construction described above. The sensor 40 is a pressure sensor for detecting, as an operation signal of the front operating mechanism 15, the arm-crowding pilot pressure in this embodiment, and the sensor 41 is a pressure sensor for detecting, as a swing operation signal, the swing pilot pressure taken out through a shuttle valve 41a. The sensor 42 is a pressure sensor for detecting, as a travel operation signal, the travel pilot pressure taken out through shuttle valves 42a, 42b and 42c.

The sensor 43 is a sensor for detecting an ON/OFF state of a key switch for the engine 32, the sensor 44 is a pressure sensor for detecting the delivery pressure of the hydraulic pumps 21a, 21b, i.e., the pump pressure, taken out through a shuttle valve 44a, and the sensor 45 is an oil temperature sensor for detecting the temperature of hydraulic oil (i.e., the oil temperature) in the hydraulic system 20. The sensor 46 is a revolution speed sensor for detecting the revolution speed of the engine 32. The sensor 47a is a fuel sensor for detecting the amount of fuel injected by the fuel injecting device of the engine 32 (i.e., the fuel consumption), the sensor 47b is a pressure sensor for detecting the blowby pressure in a cylinder of the engine 32, and the sensor 47c is a temperature sensor for detecting the temperature of a coolant (radiator water) for cooling the engine 32. The sensor 48 is a pressure sensor for detecting, as a digging pressure applied from the front operating mechanism 15, the pressure on the bottom side of the bucket cylinder 29 in this embodiment (or on the bottom side of the arm cylinder 28). The sensor 49a is a pressure sensor for detecting the traveling pressure, i.e., the pressure of the travel motor 31a or 31b (for example, a maximum one of the pressures of the travel motors 31a and 31b may be taken out through a shuttle valve not sown), and the sensor 49b is a pressure sensor for detecting the swing pressure, i.e., the pressure of the swing motor 30. Detected signals of those sensors 40 to 49 are all sent to and collected in the controller 2.

The controller 2 collects (as described later in detail) data regarding the machine operation for each part of the hydraulic excavator 1 (hereinafter referred to simply as "operation data").

FIG. 3 is a conceptual block diagram showing a flow of information in the construction machine management system shown in FIG. 1.

In FIG. 3, though not shown in detail, the machine-side controller 2 in each hydraulic excavator 1 receives, from the sensors 40 to 49, pilot pressure detected signals for the front operating mechanism 15, swing and travel, a detected signal issued upon turning-on of the key switch for the engine 32, a detected signal for the pump pressure of the pumps 21a, 21b, an oil temperature detected signal, a detected signal for the revolution speed of the engine 32, a coolant temperature detected signal, a digging pressure detected signal, a travel pressure detected signal, a fuel consumption detected signal, a blowby pressure detected signal, and a swing pressure detected signal. Based on those signals, the controller 2 computes not only the operation time for each part of the hydraulic excavator (e.g., the front operation time, the swing operation time and the travel lever operation time, but also an average pump delivery pressure, an average oil temperature, an average engine revolution speed, an average fuel consumption rate, an average engine blowby pressure, an average coolant temperature, an average digging pressure, an average traveling pressure, and an average engine run time), followed by storing the computed values, as operation data, in a not-shown memory.

The operation data thus stored in the memory of the controller 2 of each hydraulic excavator 1 is downloaded, along with machine body data (such as the machine model and the machine number), to the portable terminal 3 (see FIG. 1), which is carried with an operator and connected to the controller 2 of the hydraulic excavator 1 via the cable 3a, by performing a predetermined operation on the side of the portable terminal 3 (or the controller 2).

The operation data downloaded to the portable terminal 3 is further downloaded to the user-side personal computer 4 by disconnecting the cable 3a from the controller 2, then carrying back and connecting the portable terminal 3 to the user-side personal computer 4 via the cable 3a, and performing a predetermined operation on the side of the portable terminal 3 (or the user-side personal computer 4).

The operation data and the machine body data both downloaded to the user-side personal computer 4 are first processed in the user-side personal computer 4 by using an application program installed therein beforehand (or distributed from the side of the dealer or the like and installed as required), and are then displayed in a predetermined format as service information representing the operation status of the relevant hydraulic excavator.

On the other hand, the operation data and the machine body data both downloaded to the user-side personal computer 4 are automatically searched from the side of the main server 5 via the intermediate server 6 to check whether new data is stored in the user-side personal computer, for example, when a homepage of the dealer or the like is accessed. If new data is found, the new data is sucked up from the user-side personal computer 4 to the side of the main server 5 in the unprocessed state upon consent of the user side whenever accessed. On that occasion, in addition to the operation data and the machine body data of the hydraulic excavator 1, check data, repair data, etc. obtained at the time of routine check may also be manually entered for collection by the service personnel (serviceman) belonging to the dealer or the like. Such entered data may also be taken into the main server 5.

The main server 5 comprises input/output interfaces 5a, 5b, a CPU 5c, and a memory 5d in which a database 5A is formed. The input/output interface 5a receives the operation data and the machine body data from all the user-side personal computers 4 corresponding to all the hydraulic excavators 1. At the same time, the main server 5 also separately receives part repair/replacement data of each hydraulic excavator 1 from an intra-company computer (not shown) on the manufacturer side and the intermediate server 6 belonging to the dealer or the like.

The CPU 5c stores and accumulates those input data as the database 5A in the memory 5d, processes the information stored in the database 5A, and executes various analyses (described later in detail) primarily regarding maintenance such as repair/replacement of the parts. Then, the CPU 5c decides planned selling prices, etc. (described later in detail) for particular parts of the hydraulic excavator 1 based on results of those analyses, and transmits the decided data to the intermediate server 6 through the input/output interface 5b.

Though not shown, the main server 5 is able to display a similar screen image to that in the user-side personal computer 4 on a display unit 5D for each of all the hydraulic excavators 1 with manipulation of a keyboard 5B and a mouse 5C.

Figure 4:
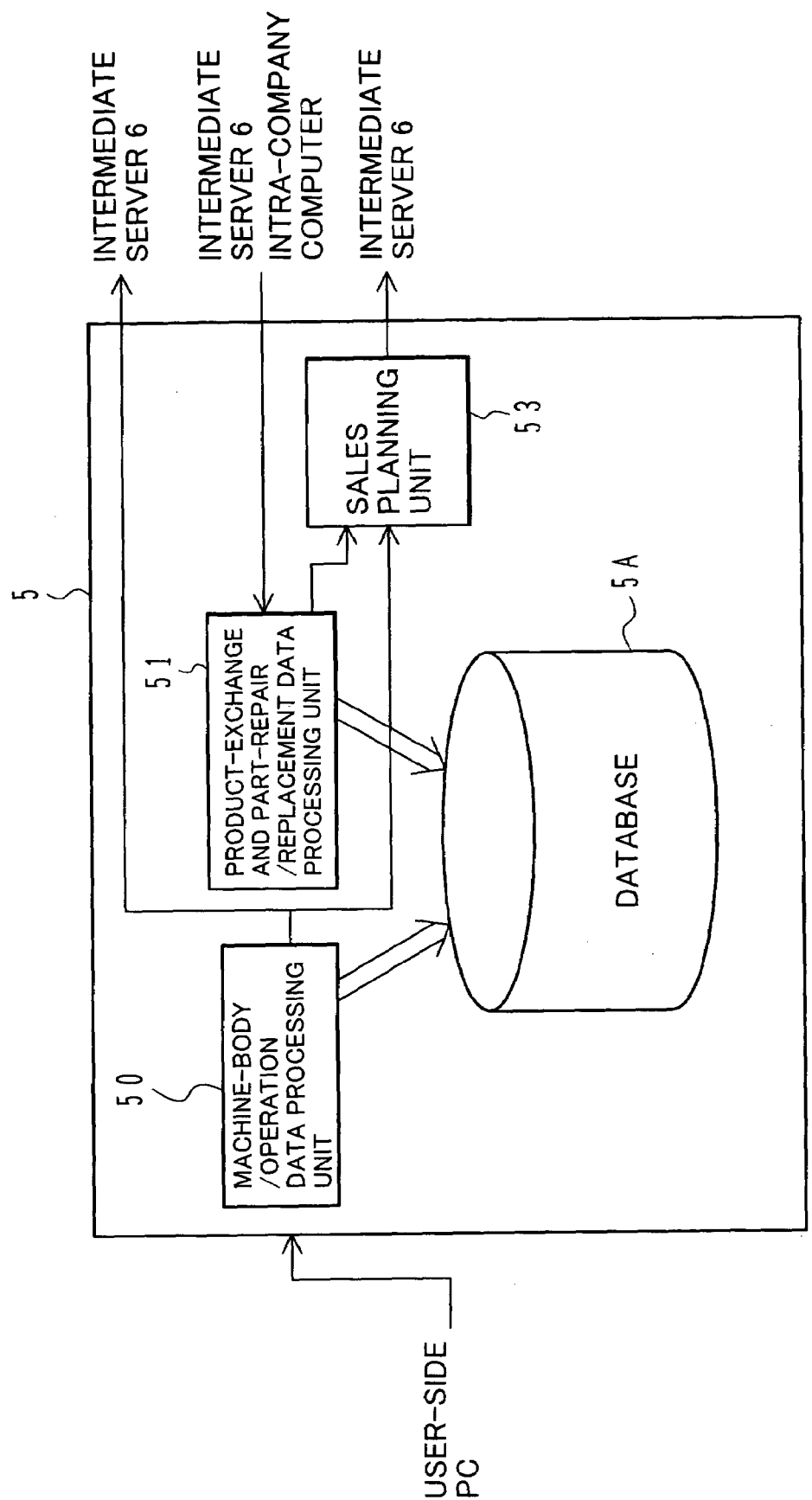
FIG. 4 is a functional block diagram showing primary functions of a main server constituting the construction machine management system as a basis for one embodiment of the information processing system for construction machines according to the present invention.

FIG. 4 is a functional block diagram showing primary functions of the main server 5. The main server 5 has various processing functions executed by a machine-body/operation data processing unit 50, a product-exchange and part-repair/replacement data processing unit 51, and a sales planning unit 53.

One function of the machine-body/operation data processing unit 50 is to transmit the operation data and the machine body data themselves in the unprocessed state to the intermediate server 6. The operation data of each hydraulic excavator 1 is further transmitted from the corresponding intermediate server 6 (belonging to the dealer or the like engaged in presenting services to the user of the relevant hydraulic excavator 1) to the corresponding user-side personal computer 4 (belonging to the user of the relevant hydraulic excavator 1). In practice, for example, at least those ones among the operation data and the machine body data of all the hydraulic excavators 1 collected into the main server 5, which are related to the hydraulic excavators 1 belonging to the relevant user, e.g., which are owned, used or managed by the relevant user, are downloaded to the user-side personal computer 4 (or the intermediate server 6 in a similar manner) with predetermined manipulation made on the user-side personal computer 4 (for example, through steps of accessing the homepage of the dealer or the like and clicking a download button on a predetermined screen image).

Another function of the machine-body/operation data processing unit 50 is to compute distribution data of the number of working excavators with respect to the operation time per machine model and per part of each hydraulic excavator by using the operation data inputted from the user-side personal computer 4, and to create a distribution graph of the number of working excavators based on the computed distribution data. The thus-created distribution graph is displayed on the display unit 5D (or the intra-company computer).

The product-exchange and part-repair/replacement data processing unit 51 computes distribution data of the number of exchanged excavators with respect to the operation time by using product-exchange and part-repair/replacement data inputted from the intermediate server 6 or the intra-company computer, and creates a distribution graph of the number of exchanged excavators based on the computed distribution data. Also, the processing unit 51 computes distribution data of the number of repaired/replaced parts in the past with respect to the operation time and to create a distribution graph of the number of repaired/replaced parts based on the computed distribution data.

By referring to the distribution graph of the number of hydraulic excavators with respect to the operation time of each hydraulic excavator, the distribution graph of the number of hydraulic excavators with respect to the operation time per part, the distribution graph of the number of exchanged hydraulic excavators with respect to the operation time of each hydraulic excavator, and the distribution graph of the number of repaired/replaced parts with respect to the operation time per component section, which have been created by the machine-body/operation data processing unit 50 and the product-exchange and part-repair/replacement data processing unit 51 as described above, the sales planning unit 53 predicts the number of parts belonging to, e.g., the front operating mechanism and the travel body (i.e., makes demand prediction), which are to be repaired or replaced if the current situation will continue as it is, and then decides a sales plan for a particular part of the hydraulic excavator based on the demand prediction.

Furthermore, based on the information created by the machine-body/operation data processing unit 50 and the product exchange and part repair/replacement data processing unit 51, the sales planning unit 53 confirms respective particular parts of plural hydraulic excavators 1 which have repair/replacement timings substantially coincident with each other, and decides the planned selling price of each of the confirmed particular parts depending on the number of those parts. Then, for at least one of the confirmed particular parts, the sales planning unit 53 decides a discount sales (campaign) period prior to the repair/replacement timing and a discount selling price (campaign price) during the discount sales period based on a future change of the machine management cost and a future change of the machine value per hydraulic excavator owned by each customer. The planned selling price, the discount sales period, the discount selling price, etc. are then outputted to the intermediate server 6 as basic information used by the dealer or the like for presenting service to the corresponding customer of the relevant hydraulic excavator 1.

Returning to FIG. 3, similarly to the main server 5, each intermediate server 6 comprises input/output interfaces 6a, 6b, a CPU 6c, and a memory 6d in which a database 6A is formed. Alternatively, the database 6A may be formed in an external memory.

The input/output interface 6a receives, from the main server 5, various information such as the planned selling price, the campaign price (discount selling price), and the campaign period (discount sales period), which have been decided by the main server 5 for each particular part of the hydraulic excavator 1. Also, the input/output interface 6a receives the operation data and the machine body data themselves in the unprocessed state from the main server 5.

The CPU 6c stores and accumulates those input data as the database 6A in the memory 6d, and then prepares an advice note for parts sales, as service information presented to each customer, based on the various information such as the planned selling price, the campaign price (discount selling price), and the campaign period (discount sales period). The advice note is transmitted to the user-side personal computer 4 of each customer via the input/output interface 5b by E-mail, for example, (as an alternative, the user-side personal computer 4 may access the homepage set up in the intermediate server 6 (e.g., the homepage of the dealer or the like) and may download the advice note with manipulation made on the side of the user-side personal computer 4).

Further, the CPU 6c has the function of transmitting the operation data and the machine body data themselves in the unprocessed state to the user-side personal computer 4 (alternatively, as in the above case, the user-side personal computer 4 may access the homepage set up in the intermediate server 6 and download the data regarding the hydraulic excavator owned by the user). On that occasion, a template and a form for displaying the operation data and the machine body data along with an explanation expressed in user's own language may be provided in, e.g., the homepage of the dealer or the like, and the operation data and the machine body data from the main server 5 may be provided to the user-side personal computer 4 through some processing, such as insetting of those data into the template, etc., instead of being in the unprocessed state. Alternatively, it is also possible to translate only language parts, which are contained in the operation data and the machine body data from the main server 5, by the intermediate server 6 and to present the translated text to the user-side personal computer 4.

In addition, the intermediate server 6 is able to display a similar screen image to that in the user-side personal computer 4 on a display unit 6D for one or more of all the hydraulic excavators 1, to which the relevant dealer or the like presents the services directly or indirectly, with manipulation of, e.g., a keyboard 6B and a mouse 6C.

The intermediate server 6 may be disposed in plural between the main server 5 and the user-side personal computer 4, instead of being disposed one as described above, so that data flows via a plurality of intermediate servers in a hierarchical way. In such a case, for example, data is first outputted from the main server 5 to the intermediate server 6 installed in an organization (e.g., the head office of the selling company or the general agency) supervising the plurality of dealers or the likes, and is then outputted from that intermediate server 6 to the other intermediate servers 6 belonging to the dealers or the likes.

As described above, because the user-side personal computer 4 receives not only the advice note sent from the intermediate server 6 via E-mail, but also the operation data and the machine body data themselves in the unprocessed state, the user-side personal computer 4 can display, on the display unit 4D, the advice note for the corresponding hydraulic excavator 1 (not limited to one, and all of the advice notes if plural hydraulic excavators are owned or used by the relevant customer), and each of the above-described screen images regarding the hydraulic excavator 1. Upon looking at those various screen images displayed on the display unit 4D, the customer (user, etc.) requests explanation, analysis, etc. for the dealer or the like, if necessary, regarding, e.g., the contents and form of the displayed information. In reply, the dealer or the like goes to the customer side to make explanation and analysis in response to questions, demands, etc. from the customer side.

Thus, with the construction machine management system, it is possible for the dealer or the like to allow, at his own discretion based on the information from the main server 5, final service information to be displayed in a predetermined form on the user-side personal computer 4, etc. through steps of, for example, accessing the homepage of the dealer or the like and clicking a download button on a predetermined screen image, as described above, or to select or restrict users to which the data is to be transmitted by actuating a lock so that the predetermined data cannot be downloaded to some users, or disabling display of a downloading screen itself for some users. In other words, the functions on the side of the main server 5 (i.e., on the manufacturer side) are restricted to those ones of receiving and collecting data from a large number of hydraulic excavators 1 and distributing the data, while a judgment made based on the distributed data regarding, e.g., what kinds of services should be finally presented to the customer (user), is left to the side of the intermediate server 6 (i.e., the side of the dealer or the like) taking charge of services in the closest relation to the customer. As a result, more appropriate and satisfactory services can be presented to the customer side with careful consideration.

More specifically, the serviceman belonging to the dealer or the like goes to the work site periodically or on demand from the user side, and recognizes, for example, site situations and demands of the customer (user, etc.) through constant contact with the customer. Corresponding to the site situations and the demands, the serviceman carries out appropriate services, such as repair/replacement of parts, for each hydraulic excavator 1 based on his own capability and judgment. Also, the serviceman makes explanation, analysis, and responses to questions, demands, etc. from the customer side regarding the data processing for the hydraulic excavator 1, the contents and form of the service information finally displayed on the user-side personal computer 4, etc.

In addition, by advantageously utilizing a scale merit resulting from the capability of predicting the part repair/replacement timings of the many hydraulic excavators 1 and by performing repair/replacement of respective particular parts for the many hydraulic excavators in a collective manner, it is possible to improve productivity, distribution efficiency, etc., and to greatly reduce the repair/replacement cost estimated for each hydraulic excavator 1. In this respect, by deciding the discount sales period (campaign period) and the discount selling price (campaign price) for the particular part and displaying them on the user-side personal computer 4, the dealer or the like can obtain an advantage of positively ensuring a profit and promotion of sales with advanced booking, while the customer side can obtain an advantage of further reducing a cost burden based on setting of the discount selling price.

The hydraulic excavator 1' shown in FIG. 3 is working in a remote site far away from the place where the dealer or the like exists. Because of such a location, it has been hitherto difficult for the dealer or the like to dispatch the serviceman to the site. With the information processing system of this embodiment, however, a certified factory, etc. (described later in detail) is set up and a serviceman can be dispatched to the site from the certified factory, etc. (as described later in detail).

(2) Expansion and Repletion of Management System with Certification of Factory, etc.

Even with the management system equipped with the controller 2 having the functions of collecting and outputting various items of information as described above, when the work site is located in a remote region, e.g., a village in the bosom of a mountain or a frontier area, far away from the place where the dealer or the like exists and there is a large distance from the existing dealer or the like to the work site as with the hydraulic excavator 1', the serviceman belonging to the dealer or the like faces a difficulty in visiting the site constantly. This results in a difficulty in collecting the operation data, etc. for the hydraulic excavator 1' and managing the hydraulic excavator 1' based on the collected data.

In this embodiment, a factory or the like existing at a relatively short distance from the site and having a sufficient technical capability or a capability of supplying parts with satisfactory quality is certified as a new member to present the services for the hydraulic excavator 1' instead of the dealer or the like. Thus, the hydraulic excavator 1' is also incorporated in the management system through the certified factory or the like so that satisfactory services are presented for the relevant machine. A principal feature of this embodiment resides in publicly calling for a member taking charge of the services from among various local factories, repair shops, etc. (hereinafter referred to as "local subcontractors") who are located in a relatively near area from the relevant hydraulic excavator 1', and then certifying, as the member taking charge of the services, one of applicants who has passed an examination with regards to qualification requirements.

Figure 5:
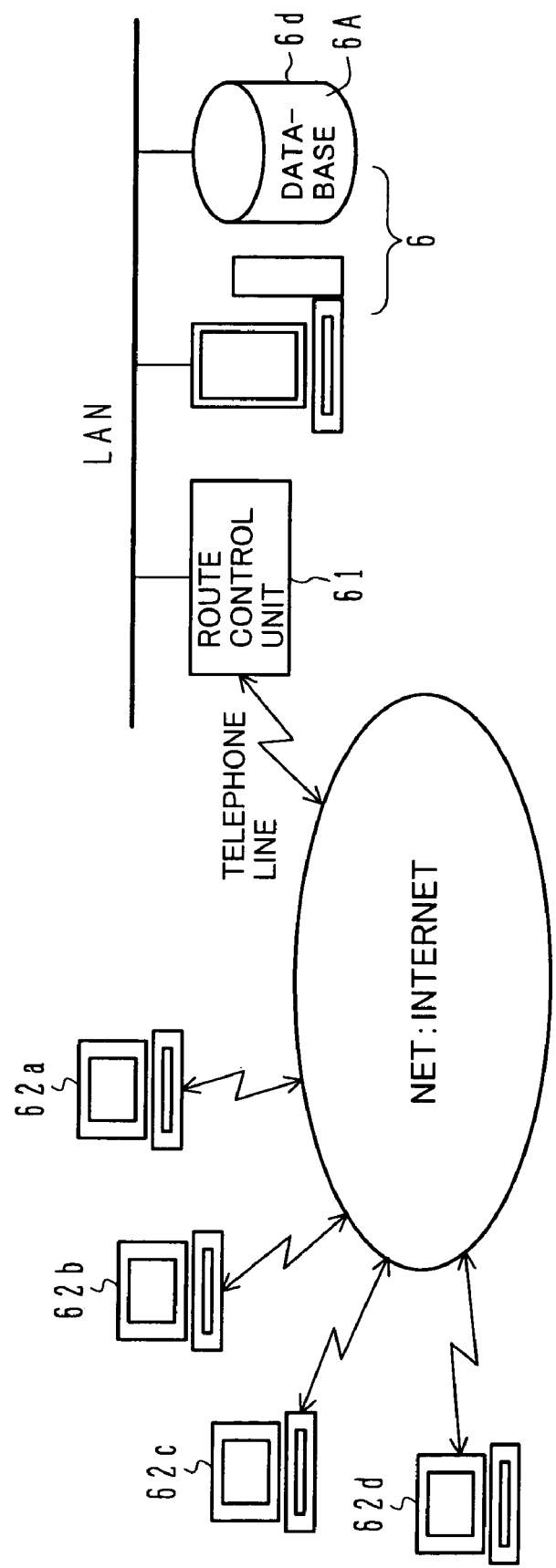
FIG. 5 is a general schematic view of one embodiment of the information processing system for construction machines according to the present invention.

FIG. 5 is a general schematic view of the information processing system of this embodiment. The information processing system comprises the intermediate server (service server) 6 installed in the dealer or the like who is originally assigned to take charge of the hydraulic excavator 1', and personal computers (various terminals) 62a, 62b, 62c, 62d, etc. of the local subcontractors which are connected to the intermediate server 6 via a network including, e.g., the Internet, a LAN, a route control unit 61, and a telephone line. Though not shown in detail, each personal computer 62 has a display unit, such as a CRT or LCD, and an input unit, such as a keyboard or mouse.

The intermediate server 6 comprises, as described above, a CPU 6a for executing control of various sections, transfer of data and various arithmetic operations, a RAM (not shown) for temporarily storing data, a ROM (not shown) for storing control programs, etc., input/output interfaces (I/O) 6a, 6b for controlling inputting and outputting of data with respect to the personal computers (hereinafter referred to as "subcontractor's personal computers") 62 via the LAN and the Internet, and a memory 6d (see FIG. 3).

Figure 6:
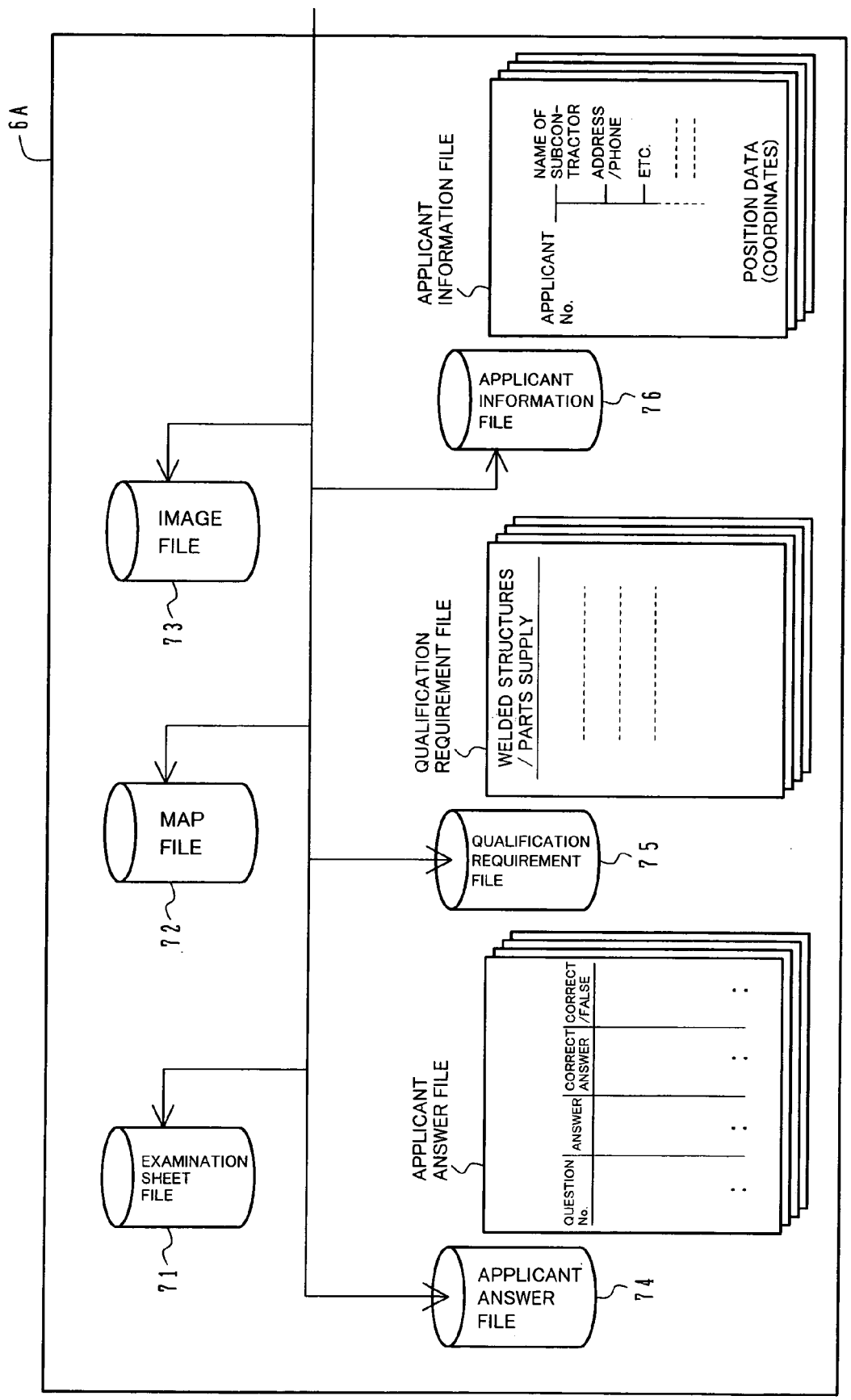
FIG. 6 is a representation showing one example of file data loaded and stored as a database in a memory of an intermediate server constituting one embodiment of the information processing system for construction machines according to the present invention.

FIG. 6 shows one example of file data loaded and stored as a database 6A in the memory 6d. As shown in FIG. 6, the database 6A contains an examination sheet file 71, a map file 72, an image file 73, an applicant answer file 74, a qualification requirement file 75, and an applicant information file 76. Details of data in these files will be described later in detail.

Details of a method for providing the information will be successively described below with reference to FIG. 7 that shows a flow of screen images displayed on the subcontractor's personal computer 62.

Figure 7:
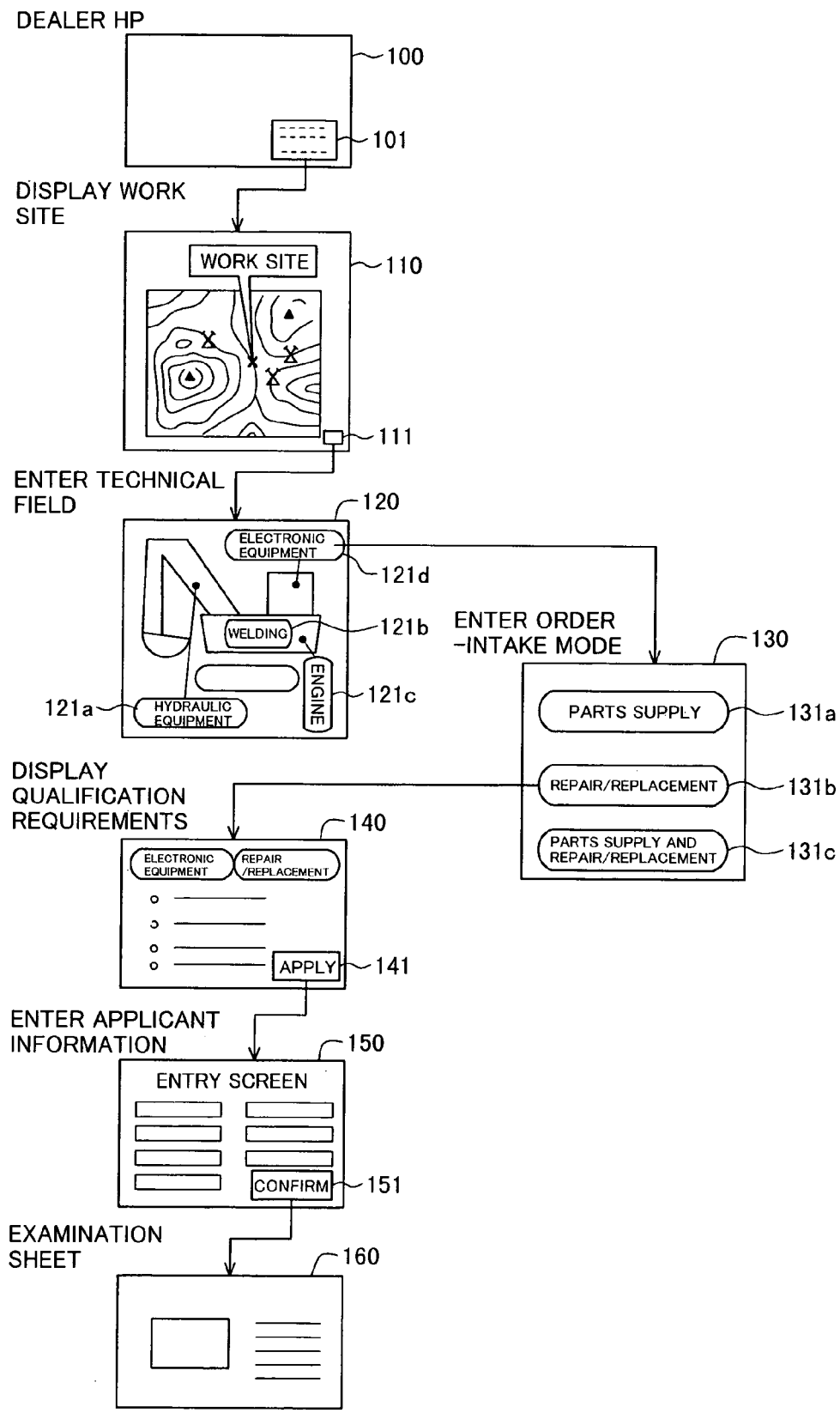
FIG. 7 shows a flow of screen images displayed on a subcontractor's personal computer constituting one embodiment of the information processing system for construction machines according to the present invention.

Referring to FIG. 7, when the subcontractor's personal computer 62 accesses the homepage of the intermediate server 6, a main screen 100 is displayed (exactly speaking, the intermediate server 6 outputs a display information signal to the subcontractor's personal computer 62, and the subcontractor's personal computer 62 receives the output signal and displays a screen image in accordance with the received information; this is similarly applied to all steps described below). Various items of news, buttons, etc. displayed on the main screen 100 contains a "Notice of Calling for Certified Factory" button 101 in the form of, e.g., a text or account. When an operator of the subcontractor's personal computer 62 manually operates (e.g., clicks; this is similarly applied to the following description) the button 101 on the screen, the display images change to a work site display screen 110.

Using the map file 72 in the database 6A, the work site display screen 110 displays a map including the position (work site) of a remote region, e.g., a village in the bosom of a mountain or a frontier area, far away from the place where the hydraulic excavator 1', i.e., a target of services (parts supply or parts repair/replacement) currently called for a subcontract factory, is working. Also, the work site display screen 110 prompts the operator to make an input for applying to the offer regarding supply of predetermined parts in a certain component section (described later) of the hydraulic excavator 1' or the offer regarding repair/replacement of predetermined parts.

In the example of FIG. 7, in addition to a geographic map of surroundings of the work site displayed on the screen 110, the work site is indicated by a mark x at the center of the screen.

At that time, when the dealer or the like decides, e.g., a distance from the work site as one of the requirements for applying to the offer, the distance may also be displayed together. For example, if the distance requirement is given as a linear distance within ○○ km, it is conceivable to display a boundary line defined by a circle with the radius of the linear distance as well, to display only an area within the circle in the geographic map, or to display only a portion within the circle in a different color. As an alternative, a designated area around the work site may be decided in advance for display. In this case, it is conceivable, for example, to display only a target administrative district (or a district substantially corresponding to it), or to display only the target district in a different color. Further, display of the work site is not limited to the form of a map, and the site requirement may be displayed in the form of characteristic information or a list (e.g., "within the radius of ○○ km from the place xx" or "target areas are ○○ village, □□ village, and ∆∆ village").

Alternatively, at the time of presenting an offer, the particular requirement for the locations of the local subcontractors may not be presented from the side of the dealer or the like and only the worksite of the hydraulic excavator 1' may be displayed (in the form of, e.g., a map or characters) so that a judgment as for whether the relevant excavator is within the serviceable distance is left at the discretion of each local subcontractor.

In the case of the local subcontractor applying to the offer after looking at the displayed information described above, the operator clicks an apply button 111 in the screen 110, whereupon the display image changes to a technical field entry screen 120.

In the technical field entry screen 120, the image file 73 in the database 6A is used to display an illustration of the hydraulic excavator, and at the same time to display the names of technical fields regarding parts themselves or repair/replacement of parts, which are currently called for subcontractors, in overlapped relation to the illustration of the hydraulic excavator. Furthermore, the technical field entry screen 120 prompts the local subcontractor to make an input for selecting the technical field as one item of the applying information. In this example, four fields, i.e., "hydraulic equipment", "welded structures", "engine", and "electronic equipment", are displayed.

The field "hydraulic equipment" means handling (e.g., supply of parts themselves and repair/replacement of parts) of an overall hydraulic circuit including, for example, hydraulic actuators, such as a boom hydraulic cylinder, an arm hydraulic cylinder, a bucket hydraulic cylinder, a swing hydraulic motor and a travel hydraulic motor, a hydraulic pump as a hydraulic source for those actuators, control valves for controlling flows of a hydraulic fluid from the hydraulic pump to the hydraulic actuators, pipes connecting the above-mentioned components, seals, and so on.

The field "welded structures" means handling (e.g., supply of parts themselves and repair/replacement of parts by welding) of various welded structures including, for example, a cover and a swing frame of an-upper swing body, a track frame of a lower travel body, operating arms such as a boom and an arm, and a digging tool such as a bucket.

The field "engine" relates to the whole of an engine driving the hydraulic pump. More specifically, it means handling (e.g., supply of parts themselves and repair/replacement of parts) of the overall engine including, for example, a combustion system provided with cylinder blocks, and other peripheral mechanisms such as an intake system, a fuel supply system, a cooling system and a lubrication system.

The field "electronic equipment" means handling (e.g., supply of parts themselves and repair/replacement of parts) of a variety of electronic equipment including, for example, various control and display units in a cab, and a control system and electrical components of the hydraulic equipment and the engine.

When the local subcontractor clicks one of technical field select buttons 121a–d in the screen 120, which correspond respectively to the fields "hydraulic equipment", "welded structures", "engine", and "electronic equipment", the display image changes to an order-intake mode entry screen 130.

The order-intake mode entry screen 130 prompts the local subcontractor to make an input for selecting, as one item of the applying information, one of three options of applying only supply of parts for maintenance, only repair/replacement work, and both of them. Corresponding to the three options, there are displayed a "parts supply" button 131a, a "repair/replacement" button 131b, and a "parts supply and repair/replacement" button 131c. When the local subcontractor clicks one of those buttons 131a–c, the display image changes to a qualification requirement screen 140.

While the above description is made in connection with the steps of displaying the work site display screen 110, making an input on the technical field entry screen 120, and displaying the order-intake mode entry screen 130, the present invention is not limited to such a sequence of the steps. For example, after the steps of making an input on the technical field entry screen 120 and making an input on the order-intake mode entry screen 130, the work site display screen 110 may be displayed to present the location requirement, etc. This sequence is particularly effective in the case in which the location requirement imposed on the local subcontractor from the side of the dealer or the like varies for one hydraulic excavator 1' depending on the technical field (described later) and the order-intake mode (described later) (e.g., in the case in which the location requirement may be within the radius of ○○ km for one technical field or one order-intake mode, but it should be within the radius of xx km for another technical field or another order-intake mode).

After confirming the results entered on the technical field entry screen 120 and the order-intake mode entry screen 130, in the qualification requirement screen 140, the qualification requirement file 75 in the database 6A is used to extract and display summary data required for the local subcontractor, such as what kind of technical capability is required in the relevant order-intake mode in the relevant technical mode, what levels of technical standards and accuracy are required for the relevant part, and what kinds of equipment and facilities are necessary, (i.e., qualification requirements).

FIG. 7 shows an example in which the field "electronic equipment" was selected on the technical field entry screen 120 and the button "repair/replacement" was selected on the order-intake mode entry screen 130. In this example, items demanded to the local subcontractor, such as "University graduate of the electrical engineering or electronics department", "Qualified person in electric or electronic fields", "at least 0 years of service in electric or electronic companies", "at least 0 years of experience in soldering work", "at least 0 years of experience in work regarding manufacture of electric circuits", and "capability of preparing computer programs", are displayed. As an alternative, what kinds of work are required to perform in fact may be displayed in more concrete forms, such as "circuit connection in the event of disconnection or a short circuit", "fuse replacement", "installation upon version-up of control programs", and "downloading of operation data, etc.".

Though not described here in detail, the qualification requirement screen 140 is likewise displayed for the other technical field and order-intake mode.

In the case of the local subcontractor continuing the step of applying to the offer after looking at the displayed information described above, the operator clicks an apply button 141 in the screen 140, whereupon the display image changes to an applicant information entry screen 150.

The applicant information entry screen 150 prompts the operator to enter applicant information, such as the name of an applicant (local subcontractor) (or the name of a person, corporation, organization, etc.), the category of business (e.g., electrical engineering, manufacturing of hydraulic equipment, automobile repair, and welding), the address, and the contact (including the phone number, E-mail address, etc.). After entering those items of information, when the local subcontractor clicks, e.g., a "confirm" button 151, the contents of the confirmed information are transmitted to the intermediate server 6 and immediately loaded and stored, as the applicant information file 76, in the database 6A together with the assigned applicant number (see FIG. 6).

At that time, the location information entered from the local subcontractor on the screen 150 may be recognized as coordinate value information (position data) on map data by using the map information stored as the map file 72 in the database 6A, and the thus-recognized position data may also be written and stored in the applicant information file 76.

After completion of the above-described step, the display image changes to an examination sheet screen 160.

In the examination sheet screen 160, the examination sheet file 71 in the database 6A is used to prepare, depending on the results entered on the technical field entry screen 120 and the order-intake mode entry screen 130, an examination sheet (test sheet) for examining whether the relevant applicant meets the qualification requirements for the relevant order-intake mode in the relevant technical field, and then to display the examination sheet (in the form of prompting the operator to fill predetermined blanks in the sheet). The examination sheet will be described in more detail below with reference to FIGS. 8 to 11.

(3) Examination Sheet

FIGS. 8 to 11 each show one example of the examination sheet (question sheet) displayed when the field "electronic equipment" was selected on the technical field entry screen 120 and the button "repair/replacement" was selected on the order-intake mode entry screen 130. Each of the examination sheets of FIGS. 8, 9, 10 and 11 provides one major question. A test in this embodiment is made up of four questions in total.

A first question shown in FIG. 8 is in the form selecting a correct one of listed options corresponding to each blank. A voltage-current characteristic of a heating wire is depicted as shown. Then, questions are set as follows: (1) what is a value of the current flowing when a voltage of 20 V is applied?; and (2) What relationship does exist between voltage and current, and what's Law is the relationship? A total of seven options are listed in a lower area as follows: "A; 0.15 A", "B; 1.5 A", "C; 15A", "D; proportional", "E; inverse proportional", "F; Ohm", and "G; Fleming".

A second question shown in FIG. 9 is in the form entering a numerical value in each blank. A simple circuit comprising a power supply of 13.2 V, two 10-Ω resistances, two 20-Ω resistances, switches S1, S2, and an ammeter is depicted as shown. Then, questions are set as follows: (1) what ampere does the ammeter point when only the switch S1 is closed?; (2) what ampere does the ammeter point when only the switch S2 is closed?; and (3) how much volts is the voltage between points A and B, and how much amperes is the current flowing a point P when the ammeter points 0.6 ampere upon closing of both the switches S1 and S3?

A third question shown in FIG. 10 is also in the form entering a numerical value in each blank. A circuit comprising a power supply, three 8-Ω resistances R1, R2 and R3, a resistance R4 having an unknown value, and two ammeters is depicted as shown. Then, questions are set as follows: on condition that the ammeter 1 points 5 A and the ammeter 2 points 2 A, (1) through which ones of the resistances does a current flow at the same value?; (2) what ampere is a value of the current flowing through the resistance R3?; (3) how much volts is the voltage applied to the resistance R4?; (4) what Ohm is a value of the resistance R4?; and (5) how much volts is the voltage between both ends of the power supply shown in FIG. 10?

A fourth question shown in FIG. 11 is in the form of selecting a correct one of listed options corresponding to each blank. A voltage-current characteristic of a heating wire is depicted as shown. A circuit comprising a DC power supply, resistances H1, H2 made of the same material and differing from each other only in cross-sectional area, a switch, a voltmeter, and an ammeter is depicted as shown in Illustration 1. Then, questions are set as follows: on condition that the voltmeter points 6 V and the ammeter connected to a terminal of 500 mA is in the state as shown in Illustration 2 when the switch is turned on, and that a value ratio of the resistance H1 to H2 is 1:4, (1) what ampere should be read as a current value from the ammeter shown in Illustration 2?; (2) what is a cross-sectional area ratio between the resistances H1 and H2?; and (3) what Ohm is a value of the resistance H1?, and how much volts is the voltage of the DC power supply? A total of eight options are listed in a lower area as follows: "① 10.5", "② 150", "③ 4:1", "④ 1:4", "⑤ 16:1", "⑥ 1:16", "⑦ 10", and "⑧ 7.5".

While the above description is made, by way of example, in connection with the case in which the local subcontractor accesses the home page of the dealer or the like, obtains the examination sheet, and puts answers directly in the examination sheet, the present invention is not limited to that case. For example, the examination sheet may be sent to the local subcontractor at a later date (or time) via E-mail based on the applicant information entered by the local subcontractor.

When the local subcontractor clicks, e.g., an "end-of-answer" button (not shown) after entering (or selecting) an answer corresponding to each question in the examination sheets, the contents of the confirmed answers are transmitted to the intermediate server 6 and immediately loaded and stored, as the applicant answer file 74, in the database 6A together with the assigned applicant number. At this time, the contents of the confirmed answers may also be stored in correspondence to the applicant information file 76.

After obtaining the answer information from each of the applicants in such a manner, the intermediate server 6 belonging to the dealer or the like marks the transmitted answers and selects optimum one of all the applicants who is regarded as an optimum subcontractor for receiving the order with respect to the relevant technical field and order-intake mode, taking into account passing standards (such as the rate of correct answers and, if necessary, the time having been spent to enter the answers) which are considered to be sufficient to determine the subcontractor taking charge of the relevant services. Then, a certificate indicating that the selected applicant has been certified as a subcontractor for the predetermined repair/replacement, the supply of the predetermined parts, or both of them is prepared and sent to the subcontractor's personal computer 62 belonging to the relevant local subcontractor via, e.g., E-mail. Preferably, a notice informing the other applicants of the fact that they have not been unfortunately selected as the certified factory or the like in this offer is sent to the subcontractor's personal computers 62 belonging to those applicants via, e.g., E-mail.

The above-described procedures of marking the answers, selecting the optimum local subcontractor, and sending the certificate may be manually by the operator of the intermediate server 6. As an alternative, an automating program may be installed in the intermediate server 6 beforehand so as to automatically execute all the procedures of accepting answers to the examination sheets, making the answers, and selecting a passed applicant, including the procedure of sending the certificate if necessary. Instead of sending the certificate, it is also possible to just inform the selected applicant (namely, to just make certification) of the fact that the relevant applicant has been certified as a subcontractor (i.e., that the relevant services are ordered to the selected applicant).

The personal computer 62 of the local subcontractor who has been certified as a service subcontractor for the hydraulic excavator 1' in such a way (hereinafter referred to as the "certified subcontractor") is incorporated in the management system described above in connection with FIG. 3 after predetermined procedures such as certification of user ID, and then starts to execute the business required as the service subcontractor for the relevant hydraulic excavator 1' in place of the dealer or the like.

More specifically, the operation data is downloaded from the controller 2 of the hydraulic excavator 1' in a remote site to the portable terminal 3 together with the machine body data, which is carried with the user of the hydraulic excavator 1' or the certified subcontractor, followed by further downloading to a user-side personal computer 4'. The operation data and the machine body data thus downloaded are processed in the user-side personal computer 4' by using an application program installed therein beforehand (or distributed from the side of the dealer or the like or the certified subcontractor and installed as required), and are then displayed in a predetermined format as service information representing the operation status of the relevant hydraulic excavator.

On the other hand, as in the case of the data of the hydraulic excavator 1 described above, for example, when the homepage of the dealer or the like (or the certified subcontractor) is accessed from the user-side personal computer 4', whether new data is stored in the user-side personal computer 4' is automatically searched from the side of the main server 5 via the intermediate server 6 (or the subcontractor's personal computer 62). If new data is found., the new data is sucked up from the user-side personal computer 4' to the side of the main server 5 in the unprocessed state upon consent of the user side whenever accessed. On that occasion, in addition to the operation data and the machine body data of the hydraulic excavator 1', check data, repair data, etc. obtained at the time of routine check may also be manually entered for collection by the certified subcontractor. Such entered data may also be taken into the main server 5.

In a first aspect, the operation data and the machine body data of the hydraulic excavator 1' transmitted to the main server 5 are sent in the unprocessed state to the intermediate server 6, the subcontractor's personal computer 62, and further to the user-side personal computer 4' belonging to the user of the relevant hydraulic excavator 1'. In practice, for example, those data is downloaded to the user-side personal computer 4' with predetermined manipulation made on the user-side personal computer 4' (for example, through steps of accessing the homepage of the dealer or the like or the certified subcontractor and clicking a download button on a predetermined screen image).

In a second aspect, similarly to the operation data and the machine body data of the other many hydraulic excavators 1, the operation data and the machine body data of the hydraulic excavator 1' transmitted to the main server 5 is also accumulated in the main server 5, and subjected to the various analyses in the machine-body/operation data processing unit 50 and the product-exchange and part-repair/replacement data processing unit 51 as described above. Thus, the operation data and the machine body data of the hydraulic excavator 1' serve as a part of the data used for preparing the distribution graph of the number of working hydraulic excavators, the distribution graph of the number of exchanged hydraulic excavators, and the distribution graph of the number of repaired/replaced parts. Eventually, those data further serve as a part of the data for use in predicting the demand, planning a parts selling plan, and setting the planned selling price, the campaign price and the campaign period in the sales planning unit 53. The planned selling price, the discount sales period, and the discount selling price thus set are outputted, as basic information for the services presented to the customer owing the hydraulic excavator 1', from the main server 5 to the subcontractor's personal computer 62 via the intermediate server 6.

Based on the input information, the subcontractor's personal computer 62 instead of the intermediate server 6 prepares an advice note for parts sales, as service information presented to each customer, and transmits the advice note to the user-side personal computer 4' by E-mail, for example, (as an alternative, the user-side personal computer 4' may access the homepage of the certified subcontractor and download the advice note with manipulation made on the side of the user-side personal computer 4').

As a result of receiving the advice note from the certified subcontractor 62 via E-mail and the operation data and the machine body data themselves in the unprocessed state, the user-side personal computer 4' can display the advice note for the corresponding hydraulic excavator 1' and the above-mentioned various screen images related to the hydraulic excavator 1'. Upon looking at those various displayed images, the customer (user, etc.) requests explanation, analysis, etc. for the certified subcontractor, if necessary, regarding, e.g., the contents and form of the displayed information. In reply, instead of the dealer or the like, the certified subcontractor goes to the customer side to make explanation and analysis in response to questions, demands, etc. from the customer side.

The above-described information processing system of this has advantages given below.

For the hydraulic excavator 1' working in a remote site far away from the dealer or the like, a subcontractor being located within a near range from the work site and suitable for presenting services is called for and certified on the homepage, and the certified subcontractor is commissioned to perform the service business. Therefore, satisfactory services can be presented to even the customer owing the hydraulic excavator 1'.

More specifically, the certified subcontractor taking charge of the services for the hydraulic excavator 1' goes to the work site periodically or on demand from the user side, and recognizes, for example, site situations and demands of the customer (user, etc.) through constant contact with the customer. Corresponding to the site situations and the demands, the certified subcontractor carries out repair/replacement of parts, etc. for the relevant hydraulic excavator 1' based on his own capability and judgment. Also, the certified subcontractor makes explanation, analysis, and responses to questions, demands, etc. from the customer side regarding the data processing for the hydraulic excavator 1', the contents and form of the service information finally displayed on the user-side personal computer 4', etc.

Further, based on the information inputted from the main server 5 via the intermediate server 5 such as the dealer, it is possible, as described above, to download the input information into the user-side personal computer 4' for display as final service information in a predetermined form, or to select or restrict the input information by actuating a lock so that a part of the information cannot be downloaded, or by disabling display of a download screen itself.

While the above embodiment has been described, by way of example, in connection with a hydraulic excavator as one of construction machines, the present invention is not limited to the hydraulic excavator, but is also applicable to other types of construction machines, such as a crawler crane and a wheel loader. These cases can also provide similar advantages to those obtained with the above embodiment.

Moreover, applications of the present invention are not limited to construction machines, and the present invention is further applicable to general digging and loading machines working in mine sites (such as a scraper, a rock drill (drill machine), and large-sized hydraulic excavators, wheel loaders, motor graders, etc. employed in mines). These cases can also provide similar advantages to those obtained with the above embodiment.

The above embodiment is described, by way of example, in connection with the case in which the intermediate server 6 (described later) serves as a service server on the side providing information calling for a construction-machine parts supply and repair/replacement subcontractor, and this service server is installed in the dealer or the like who exists nearer to the work site of the construction machine owned by the customer than the manufacturer, but has a difficulty in promptly presenting the services from the above-mentioned various circumstances. As mentioned above, however, the present invention is not limited to such an example. For instance, when the manufacturer or an information management firm commissioned from the manufacturer is located relatively near the work site of the construction machine owned by the customer, but has a difficulty in promptly presenting the services, the service server may be installed in, instead of the dealer or the like, the manufacturer or the information management firm. In such a case, the intermediate server 6 may be disposed in the manufacturer or the information management firm, or the function of the service server may be incorporated in the main server 5. It is a matter of course that, in anticipation of various cases, the service server may be installed in each of the manufacturer, the information management firm, the dealer or the like in each area. This can also provide similar advantages to those obtained with the above embodiment. In addition, because the information calling for a service subcontractor can be browsed on not only the homepage of the neighboring dealer or the like, but also on the homepage of the manufacturer or the information management firm, it is possible to more efficiently perform the procedure of calling for the service subcontractor.

INDUSTRIAL APPLICABILITY

According to the present invention, the selling company or the like can make a judgment whether an applicant is suitable as a subcontractor taking charge of services to the customer, and therefore can certify, as the subcontractor, one of the applicants who has been judged as optimum, so that the services to the relevant customer are commissioned to the certified subcontractor in place of the selling company or the like. Hence, even when the work site is in a remote place far away from the selling company or the like, it is possible to call for and select the subcontractor suitable for presenting the services in a near range from the work site, and to present satisfactory services to the customer.

The invention claimed is:

1. An information processing system for construction machines, which presents, to customers owing construction machines, service information for each of said construction machines, wherein said information processing system comprises:

a database for storing predetermined qualification requirements with regard to a working capability, equipment and facilities necessary for repair/replacement of parts of one of said construction machines; and a service server disposed on the side providing information calling for a repair/replacement subcontractor for said one construction machine and connected via a communication network to terminals on the side of recipients receiving the information calling for the repair/replacement subcontractor for said one construction machine, said service server executing the steps of:

displaying a work site of said one construction machine or a predetermined area regarding the work site at said terminals on the information recipient side, and prompting an input for applying to an order of repair/replacement work for parts belonging to a predetermined component section of said one construction machine;

confirming applying information entered from said terminals on the information recipient side;

extracting the predetermined qualification requirements, which have been stored in said database beforehand, from said database based on the applying information received in said confirming step;

producing, based on the qualification requirements extracted in said extracting step, an examination sheet for determining whether the information recipient meets the extracted qualification requirements; and transmitting the examination sheet produced in said producing step to said terminals on the information recipient side via said communication network, and prompting an input in predetermined places of the examination sheet.

2. An information processing system for construction machines according to claim 1, wherein said service server executes the steps of:

receiving information entered in the predetermined places of the examination sheet and transmitted from said terminals on the information recipient side;

determining, based on the entered information received in said receiving step, who of the information recipients meets the qualification requirements;

producing, if the determination is affirmatively made in said determining step, a proof indicating that the relevant information recipient has been certified as the parts-supply subcontractor, the repair/replacement subcontractor, or the parts-supply and repair/replacement subcontractor; and transmitting the proof of the certification produced in said producing step to corresponding one of said terminals on the information recipient side.

3. An information processing system for construction machines according to any claim 1, wherein said service server is disposed in a manufacturer or an information management firm commissioned from said manufacturer, who is located in a region far away from the work site of said one construction machine owned by the customer and faces a difficulty in presenting services directly to the customer.

4. An information processing system for construction machines according to claim 1, wherein said service server is disposed in a commissioned service agency who is located closer to the work site of said one construction machine (1) owned by the customer than a manufacturer, but faces a difficulty in promptly presenting services the customer due to individual circumstances.

5. An information processing system for construction machines according to claim 1, wherein said service server is disposed in a manufacturer or an information management firm commissioned from said manufacturer, who is located in a region far away from the work site of said one construction machine owned by the customer and faces a difficulty in presenting services directly to the customer, or in a commissioned service agency who is located closer to the work site than said manufacturer, but faces a difficulty in promptly presenting services the customer due to individual circumstances.

6. An information processing system for construction machines, which presents, to customers owing construction machines, service information for each of said construction machines, wherein said information processing system comprises:

a database for storing predetermined qualification requirements with regard to parts necessary for repair/-replacement of one of said construction machines; and a service server disposed on the side providing information calling for a subcontractor for supplying parts of said construction machine and connected via a communication network to terminals on the side of recipients receiving the information calling for the parts supply subcontractor for said one construction machine, said service server executing the steps of:

displaying a work site of said one construction machine or a predetermined area regarding the work site at said terminals on the information recipient side, and prompting an input for applying to an order of supply of parts necessary for repair/replacement related to a predetermined component section of said one construction machine;

confirming applying information entered from said terminals on the information recipient side;

extracting the predetermined qualification requirements, which have been stored in said database beforehand, from said database based on the applying information received in said confirming step;

producing, based on the qualification requirements extracted in said extracting step, an examination sheet for determining whether the information recipient meets the extracted qualification requirements; and transmitting the examination sheet produced in said producing step to said terminals on the information recipient side via said communication network, and prompting an input in predetermined places of the examination sheet.

7. An information processing system for construction machines, which presents, to customers owing construction machines, service information for each of said construction machines, wherein said information processing system comprises:

a database for storing predetermined qualification requirements with regard to parts necessary for repair/-replacement of one of said construction machines and a working capability, equipment and facilities necessary for the repair/replacement; and a service server disposed on the side providing information calling for a parts-supply and repair/-replacement subcontractor for said construction machine and connected via a communication network to terminals on the side of recipients receiving the information calling for the parts-supply and repair/replacement subcontractor for said one construction machine, said service server executing the steps of:

displaying a work site of said one construction machine or a predetermined area regarding the work site at said terminals on the information recipient side, and prompting an input for applying to an order of supply of parts necessary for repair/replacement related to a predetermined component section of said one construction machine and work of the repair/replacement;

confirming applying information entered from said terminals on the information recipient side;

extracting the predetermined qualification requirements, which have been stored in said database beforehand, from said database based on the applying information received in said confirming step;

producing, based on the qualification requirements extracted in said extracting step, an examination sheet for determining whether the information recipient meets the extracted qualification requirements; and transmitting the examination sheet produced in said producing step to said terminals on the information recipient side via said communication network, and prompting an input in predetermined places of the examination sheet.

8. An information processing method for construction machines via a communication network connecting terminals on the side of recipients receiving information calling for a repair/replacement subcontractor for a construction machine and a service server disposed on the side providing the information calling for the repair/replacement subcontractor for said construction machine, wherein said service server executes the steps of: displaying a work site of said construction machine or a predetermined area regarding the work site at said terminals on the information recipient side, and prompting an input for applying to an order of repair/replacement work for parts belonging to a predetermined component section of said construction machine;

confirming applying information entered from said terminals on the information recipient side;

extracting predetermined qualification requirements with regard to a working capability, equipment and facilities necessary for repair/replacement of parts of said construction machine, which have been stored in a database beforehand, from said database based on the applying information received in said confirming step;

producing, based on the qualification requirements extracted in said extracting step, an examination sheet for determining whether the information recipient meets the extracted qualification requirements; and transmitting the examination sheet produced in said producing step to said terminals on the information recipient side via said communication network, and prompting an input in predetermined places of the examination sheet.

9. An information processing method for construction machines according to claim 8, wherein said service server executes the steps of:

receiving information entered in the predetermined places of the examination sheet and transmitted from said terminals on the information recipient side;

determining, based on the entered information received in said receiving step, who of the information recipients meets the qualification requirements;

producing, if the determination is affirmatively made in said determining step, a proof indicating that the relevant information recipient has been certified as the parts-supply subcontractor, the repair/replacement subcontractor, or the parts-supply and repair/replacement subcontractor; and transmitting the proof of the certification produced in said producing step to corresponding one of said terminals on the information recipient side.

10. An information processing method for construction machines according to claim 8, wherein said service server is disposed in a manufacturer or an information management firm commissioned from said manufacturer, who is located in a region far away from the work site of said construction machine owned by the customer and faces a difficulty in presenting services directly to the customer.

11. An information processing method for construction machines according to claim 8, wherein said service server is disposed in a commissioned service agency who is located closer to the work site of said construction machine owned by the customer than a manufacturer, but faces a difficulty in promptly presenting services the customer due to individual circumstances.

12. An information processing method for construction machines according to claim 8, wherein said service server is disposed in a manufacturer or an information management firm commissioned from said manufacturer, who is located in a region far away from the work site of said construction machine owned by the customer and faces a difficulty in presenting services directly to the customer, or in a commissioned service agency who is located closer to the work site than said manufacturer, but faces a difficulty in promptly presenting services the customer due to individual circumstances.

13. An information processing method for construction machines via a communication network connecting terminals on the side of recipients receiving information calling for a repair/replacement subcontractor for a construction machine and a service server disposed on the side providing the information calling for the repair/replacement subcontractor for said construction machine, wherein said service server executes the steps of:

displaying a work site of said construction machine or a predetermined area regarding the work site at said terminals on the information recipient side, and prompting an input for applying to an order of supply of parts necessary for repair/replacement related to a predetermined component section of said construction machine;

confirming applying information entered from said terminals on the information recipient side;

extracting predetermined qualification requirements with regard to parts necessary for repair/replacement of said construction machine, which have been stored in a database beforehand, from said database based on the applying information received in said confirming step;

producing, based on the qualification requirements extracted in said extracting step, an examination sheet for determining whether the information recipient meets the extracted qualification requirements; and transmitting the examination sheet produced in said producing step to said terminals on the information recipient side via said communication network, and prompting an input in predetermined places of the examination sheet.

14. An information processing method for construction machines via a communication network connecting terminals on the side of recipients receiving information calling for a repair/replacement subcontractor for a construction machine and a service server disposed on the side providing the information calling for the repair/replacement subcontractor for said construction machine, wherein said service server executes the steps of:

- displaying a work site of said construction machine or a predetermined area regarding the work site at said terminals on the information recipient side, and prompting an input for applying to an order of supply of parts necessary for repair/replacement related to a predetermined component section of said construction machine and work of the repair/replacement;
- confirming applying information entered from said terminals on the information recipient side;
- extracting predetermined qualification requirements with regard to parts necessary for repair/replacement of said construction machine and a working capability, equipment and facilities necessary for the repair/-replacement, which have been stored in a database beforehand, from said database based on the applying information received in said confirming step;
- producing, based on the qualification requirements extracted in said extracting step, an examination sheet for determining whether the information recipient meets the extracted qualification requirements; and
- transmitting the examination sheet produced in said producing step to said terminals on the information recipient side via said communication network, and prompting an input in predetermined places of the examination sheet.

* * * * *